United States Patent
Kurita

(10) Patent No.: US 9,446,649 B2
(45) Date of Patent: Sep. 20, 2016

(54) DAMPER CONTROL DEVICE

(71) Applicant: KAYABA INDUSTRY CO., LTD., Tokyo (JP)

(72) Inventor: Norihiko Kurita, Gifu (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 14/431,770

(22) PCT Filed: Sep. 27, 2013

(86) PCT No.: PCT/JP2013/076244
§ 371 (c)(1),
(2) Date: Mar. 26, 2015

(87) PCT Pub. No.: WO2014/051045
PCT Pub. Date: Apr. 3, 2014

(65) Prior Publication Data
US 2015/0239317 A1    Aug. 27, 2015

(30) Foreign Application Priority Data

Sep. 27, 2012  (JP) .................................. 2012-214410
Sep. 13, 2013  (JP) .................................. 2013-190097

(51) Int. Cl.
*B62K 25/04*    (2006.01)
*B60G 17/015*   (2006.01)
(Continued)

(52) U.S. Cl.
CPC ......... *B60G 17/0152* (2013.01); *B60G 17/016* (2013.01); *B60G 17/0164* (2013.01); *B60G 17/08* (2013.01); *B62K 25/04* (2013.01); *F16F 9/512* (2013.01); *B60G 2202/24* (2013.01); *B60G 2300/12* (2013.01); *B60G 2400/0522* (2013.01); *B60G 2400/34* (2013.01);
(Continued)

(58) Field of Classification Search
CPC   B60G 17/0152; B60G 17/08; B60G 17/016; B60G 2202/24; B60G 2800/014; B60G 2500/10; B60G 2400/0522; B60G 2400/5182; B60G 2300/12; F16F 9/512; B62K 25/04; B62K 2025/044; B62K 2207/04
See application file for complete search history.

(56) References Cited

U.S. PATENT DOCUMENTS 5,211,420 A * 5/1993  Iwashita .............. B60G 15/063
                                                180/219
6,513,797 B2 * 2/2003  Sawai ................ B60G 17/0416
                                                188/322.17
(Continued)

FOREIGN PATENT DOCUMENTS

JP    2001-294027    * 10/2001
JP    2001-334817 A   12/2001
(Continued)

*Primary Examiner* — Michael J Zanelli
(74) *Attorney, Agent, or Firm* — Rabin & Berdo, P.C.

(57) ABSTRACT

A damper control device includes a pitching angular velocity detection unit that detects a pitching angular velocity of a vehicle body, a front wheel side pressure detection unit that detects a pressure of a compression side chamber in a front wheel side damper, and a rear wheel side pressure detection unit that detects a pressure of a compression side chamber in a rear wheel side damper. The damper control device controls the pressure of the compression side chamber in the front wheel side damper and the pressure of the compression side chamber in the rear wheel side damper based on the pitching angular velocity, the pressure of the compression side chamber in the front wheel side damper and the pressure of the compression side chamber in the rear wheel side damper.

7 Claims, 5 Drawing Sheets

(51) Int. Cl.
  B60G 17/016 (2006.01)
  B60G 17/08 (2006.01)
  F16F 9/512 (2006.01)

(52) U.S. Cl.
  CPC ... *B60G2400/39* (2013.01); *B60G 2400/5182* (2013.01); *B60G 2500/10* (2013.01); *B60G 2800/014* (2013.01); *B62K 2025/044* (2013.01); *B62K 2207/04* (2013.01)

(56) References Cited

U.S. PATENT DOCUMENTS

2006/0181034 A1\* 8/2006 Wilde ................... B60G 15/12
  280/5.515

2012/0279815 A1\* 11/2012 Iwase ................... B60G 17/08
  188/266.2

FOREIGN PATENT DOCUMENTS

| | | |
|---|---|---|
| JP | 2002-166717 A | 6/2002 |
| JP | 2005-028934 A | 2/2005 |
| JP | 2009-006882 A | 1/2009 |
| JP | 2009-078725 A | 4/2009 |
| JP | 2009-160964 A | 7/2009 |
| JP | 2011-529822 A | 12/2011 |
| JP | 2012-001160 A | 1/2012 |
| WO | WO-2010/022852 A1 | 3/2010 |

\* cited by examiner

DAMPER CONTROL DEVICE

TECHNICAL FIELD

The present invention relates to a damper control device.

BACKGROUND ART

A damper control device controls damping forces of a front wheel side damper that is interposed between a vehicle body and a front wheel of a two-wheeled vehicle and a rear wheel side damper that is interposed between the vehicle body and a rear wheel. JP2011-529822A discloses a damper control device that controls the damping forces by using skyhook control.

The damper control device is provided with a stroke sensor that detects a stroke of the front wheel side damper, a stroke sensor that detects a stroke of the rear wheel side damper, and a pitching sensor that detects a pitching angular velocity of the vehicle body. The damper control device performs computation of stroke speeds of the front wheel side damper and the rear wheel side damper by differentiating displacements that are detected by the stroke sensors. In addition, based on the pitching angular velocity and the stroke speeds of the front wheel side damper and the rear wheel side damper, the damper control device performs open loop control of the damping forces of the respective dampers by referring to a three-dimensional map that is prepared in advance, and calculating damping coefficients of the front wheel side damper and the rear wheel side damper.

SUMMARY OF INVENTION

Although the conventional damper control device as described above requires the stroke sensors, it is difficult for a two-wheeled vehicle that does not have a link mechanism on its suspension to attach the stroke sensors thereon. As such, it is possible to provide an acceleration sensor for detecting a vertical acceleration of the vehicle body or a wheel, instead of the stroke sensors, so as to detect the stroke speeds by integrating an acceleration detected by the acceleration sensor. However, it may be difficult for the two-wheeled vehicle to calculate the stroke speeds, due to a significant change in a vehicle body posture that is unique to the two-wheeled vehicle. In this case, it is impossible to obtain the stroke speeds of the front wheel side damper and the rear wheel side damper accurately. This makes it difficult for the two-wheeled vehicle, not having the link mechanism on its suspension, to mount the damper control device.

Further, according to the conventional damper control device as described above, the damping coefficients of the front wheel side damper and the rear wheel side damper are adjusted. This may cause an error between the actual damping force and the damping force that each of the dampers is desired to exhibit, due to a change in oil temperature in the dampers and the like. In this case, there is the possibility of deteriorating riding comfortability of the two-wheeled vehicle.

It is an object of the present invention to provide a damper control device that is easily mounted on the two-wheeled vehicle, and that can improve the riding comfortability of the two-wheeled vehicle.

According to one aspect of the present invention, a damper control device controls a pressure of a compression side chamber of a front wheel side damper that is interposed between a vehicle body and a front wheel of a two-wheeled vehicle, and a pressure of a compression side chamber of a rear wheel side damper that is interposed between the vehicle body and a rear wheel. The damper control device includes a pitching angular velocity detection unit adapted to detect a pitching angular velocity of the vehicle body, a front wheel side pressure detection unit adapted to detect the pressure of the compression side chamber in the front wheel side damper, and a rear wheel side pressure detection unit adapted to detect the pressure of the compression side chamber in the rear wheel side damper. The pressure of the compression side chamber in the front wheel side damper and the pressure of the compression side chamber in the rear wheel side damper are controlled based on the pitching angular velocity, the pressure of the compression side chamber in the front wheel side damper and the pressure of the compression side chamber in the rear wheel side damper.

DESCRIPTION OF EMBODIMENTS

Hereinafter, embodiments of the present invention are described with reference to the accompanying drawings.

First, an explanation will be given to a first embodiment.

Figure 1:
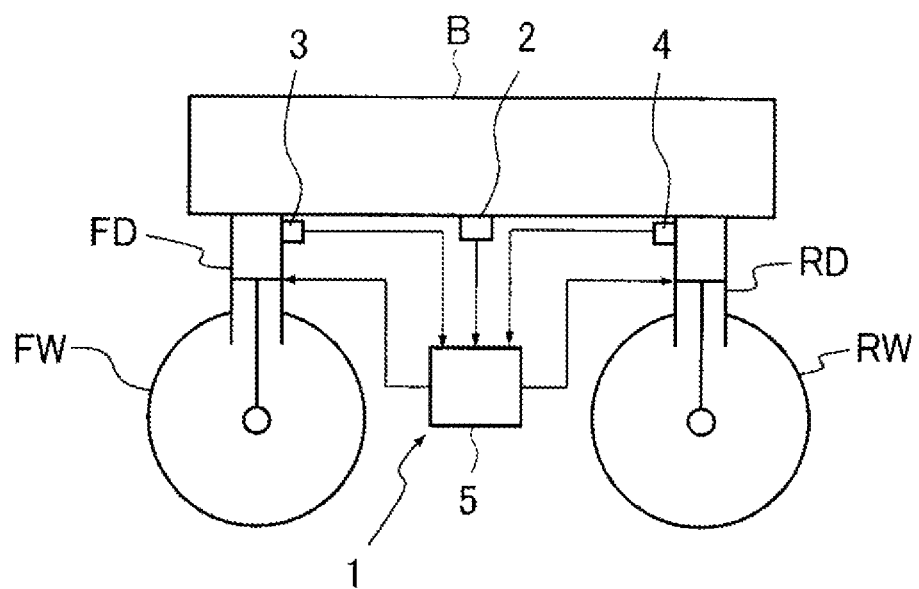
FIG. 1 is a schematic block diagram of a damper control device according to a first embodiment of the present invention.
Figure 2:
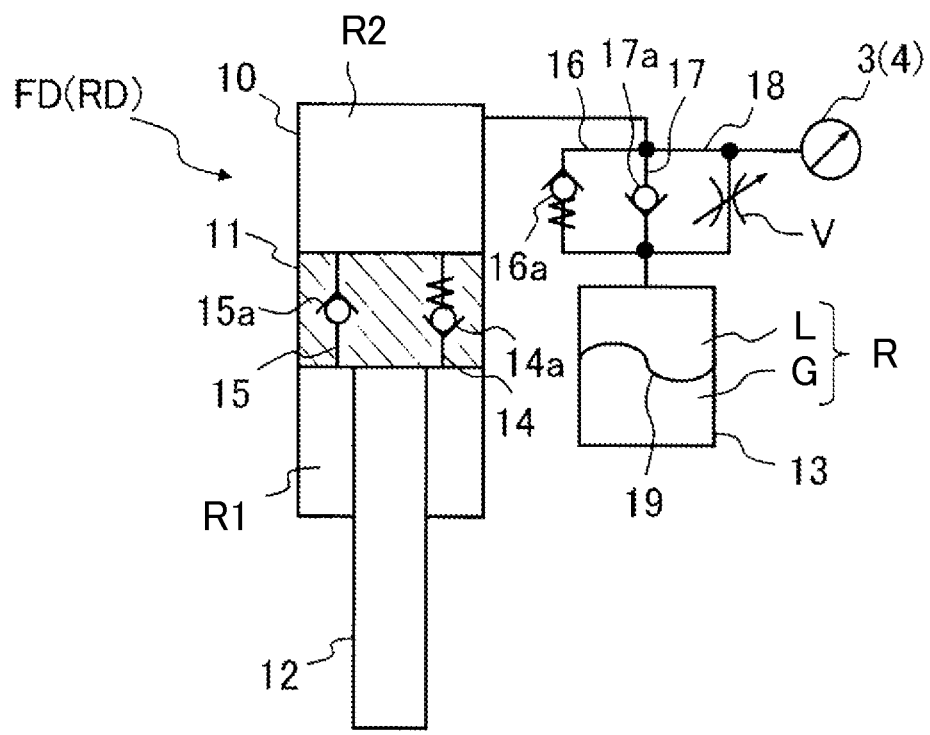
FIG. 2 is a schematic view of a front wheel side damper and a rear wheel side damper of the damper control device according to the first embodiment of the present invention.
Figure 3:
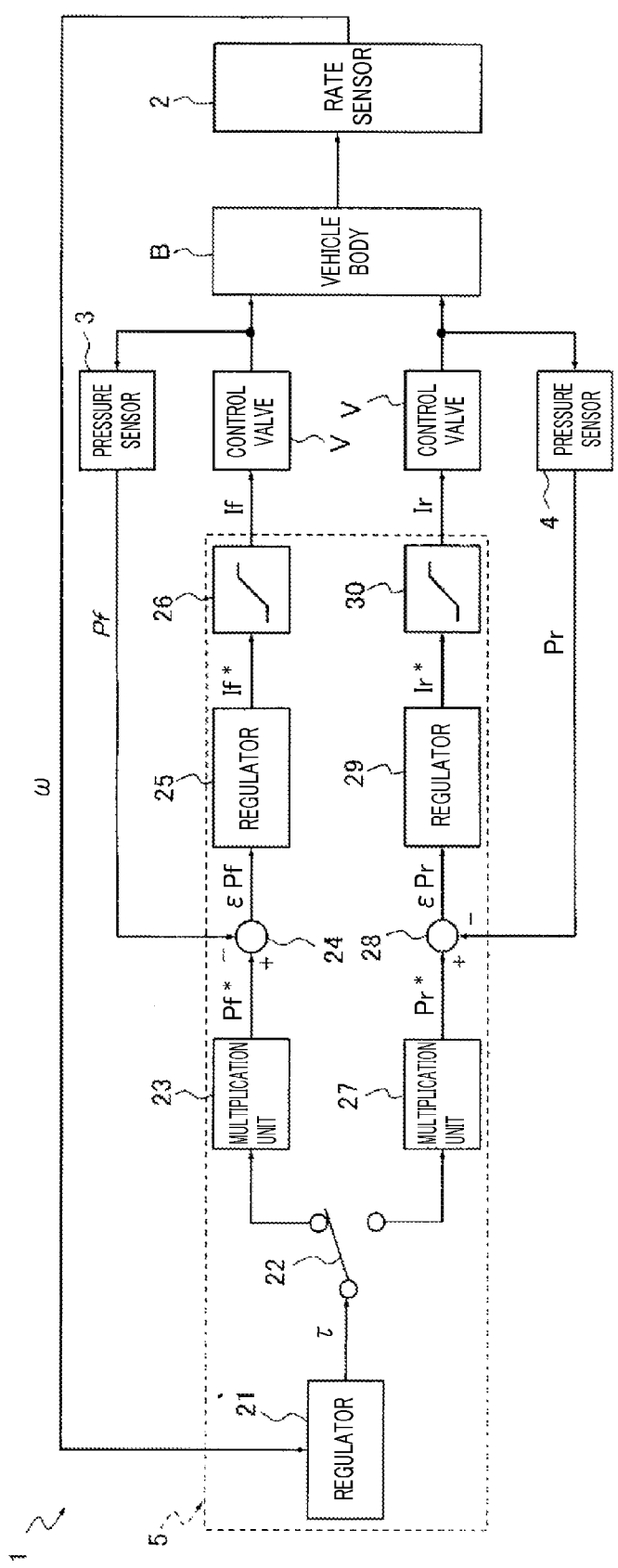
FIG. 3 is a control block diagram of the damper control device according to the first embodiment of the present invention.

As illustrated in FIG. 1 to FIG. 3, a damper control device 1 according to this embodiment controls a pressure of a compression side chamber R2 in each of a front wheel side damper FD that is interposed between a vehicle body B of a two-wheeled vehicle and a front wheel FW, and a rear wheel side damper RD that is interposed between the vehicle body B and a rear wheel RW.

The damper control device is provided with a rate sensor 2 that serves as a pitching angular velocity detection unit for detecting a pitching angular velocity ω of the vehicle body B, a pressure sensor 3 that serves as a front wheel side pressure detection unit for detecting a pressure Pf of the compression side chamber R2 in the front wheel side damper FD, a pressure sensor 4 that serves as a rear wheel side pressure detection unit for detecting a pressure Pr of the compression side chamber R2 in the rear wheel side damper RD, and a control unit 5 that controls the pressure of the compression side chamber R2 in each of the front wheel side damper FD and in the rear wheel side damper RD, based on the pitching angular velocity ω, the pressure Pf of the compression side chamber R2 in the front wheel side damper FD, and the pressure Pr of the compression side chamber R2 in the rear wheel side damper RD.

As illustrated in FIG. 2, each of the front wheel side damper FD and the rear wheel side damper RD is provided with a cylinder 10, a piston 11 that is slidably inserted into the cylinder 10 and that divides the cylinder 10 into an extension side chamber R1 and a compression side chamber R2, in which liquid is filled, a piston rod 12 that is movably inserted into the cylinder 10 and that is connected to the piston 11, a tank 13 that is provided with a reservoir R being in communication with the compression side chamber R2 in its inside, an extension side damping passage 14 that applies resistance to a liquid flow flowing from the extension side chamber R1 to the compression side chamber R2, a compression side passage 15 that is provided in parallel to the extension side damping passage 14 and that permits only a liquid flow flowing from the compression side chamber R2 to the extension side chamber R1, a compression side damping passage 16 that applies resistance to a liquid flow flowing from the compression side chamber R2 to the reservoir R, an intake passage 17 that is provided in parallel to the compression side damping passage 16 and that permits only a liquid flow flowing from the reservoir R to the compression side chamber R2, a bypass passage 18 that is provided in parallel to the compression side damping passage 16 and the intake passage 17 and that allows the compression side chamber R2 and the reservoir R to be in communication with each other, and a control valve V that is provided in the middle pf the bypass passage 18 and that serves as a pressure controlling element for adjusting the pressure of the compression side chamber R2.

The lower end of the cylinder 10 in FIG. 2, as the end portion on the side from which the piston rod 12 protrudes, is connected to the front wheel FW or the rear wheel RW of the two-wheeled vehicle, and the upper end of the cylinder 10 in FIG. 2 is connected to the vehicle body B of the two-wheeled vehicle. The liquid is filled in the extension side chamber R1 and the compression side chamber R2. The reservoir R is divided into a liquid chamber L and a gas chamber G by an elastic partition wall 19 that is provided inside the tank 13. It should be noted that a free piston, instead of the elastic partition wall 19, may be slidably inserted into the tank 13, so as to divide the reservoir R into the liquid chamber L and the gas chamber G. In addition to hydraulic oil, water, aqueous solution or the like may be employed as the liquid.

The extension side damping passage 14 is provided with a damping valve 14a in the middle of the passage. The damping valve 14a applies resistance to the liquid flow flowing through the extension side damping passage 14. The compression side passage 15 is provided with a check valve 15a in the middle of the passage. The check valve 15a limits the liquid flowing through the compression side passage 15 to flow in a one-way direction. The compression side damping passage 16 is provided with a damping valve 16a in the middle of the passage. The damping valve 16a applies resistance to the liquid flow flowing through the compression side damping passage 16. The intake passage 17 is provided with a check valve 17a in the middle of the passage. The check valve 17a limits the liquid flowing through the intake passage 17 to flow in a one-way direction.

The check valve 15a permits only the liquid flow flowing from the compression side chamber R2 to the extension side chamber R1, and the resistance applied to the liquid flow is set to the extent that the resistance does not affect the compression side damping force. Incidentally, it is also possible to allow the check valve 15a to function as a damping valve that provides a differential pressure actively to the compression side chamber R2 and the extension side chamber R1. In this case, the extension side damping passage 14 and the compression side passage 15 may be formed integrally, and the resistance may be applied to the flow while permitting the liquid to pass through the extension side chamber R1 and the compression side chamber R2 bidirectionally.

The control valve V may be, for example, an electromagnetic valve or the like that drives a valve body by a solenoid, and is able to change a passage area by adjusting the position of the valve body according to a supplied current amount. According to the change in the passage area, the control valve V can change the resistance to be applied to the liquid flowing through the bypass passage 18. Incidentally, the control valve V may be a variable throttle-type valve, or an on-off-type valve.

When extension operation of each of the front wheel side damper FD and the rear wheel side damper RD is made, the liquid moves from the compressed extension side chamber R1 to the increased compression side chamber R2 via the extension side damping passage 14. As the extension side damping passage 14 applies resistance to the liquid flow at this time, a differential pressure is caused between the extension side chamber R1 and the compression side chamber R2, and, according to the differential pressure, an extension side damping force that suppresses the extension operation is exhibited. In addition, the liquid is supplied from the reservoir R into the compression side chamber R2 via the intake passage 17, and the volume of the piston rod 12 that retracts from the cylinder 10 is compensated. Thus, each of the front wheel side damper FD and the rear wheel side damper RD functions as a passive damper whose damping characteristic does not change at the time of the extension operation.

On the contrary, when contraction operation of each of the front wheel side damper FD and the rear wheel side damper RD is made, the liquid moves from the compressed compression side chamber R2 to the increased extension side chamber R1 via the compression side passage 15. As the piston rod 12 enters the cylinder 10, the extra liquid of the cylinder 10 is discharged from the compression side chamber R2 to the reservoir R via the compression side damping passage 16 and the bypass passage 18. Thus, the liquid, corresponding to the volume of the piston rod 12 entering the cylinder 10, is discharged from the cylinder 10 to the reservoir R, and the volume of the piston rod 12 entering the cylinder 10 is compensated. When the liquid moves from the compression side chamber R2 to the reservoir R, the compression side damping passage 16 and the control valve V apply resistance to the liquid flow passing therethrough, and therefore the pressure inside the cylinder 10 increases. Thus, each of the front wheel side damper FD and the rear wheel side damper RD exhibits the compression side damping force that suppresses the contraction operation.

Here, a change in a degree of opening (passage area) in the control valve V that is provided in the middle of the bypass passage 18 changes the passage area that allows the compression side chamber R2 and the reservoir R to be in communication with each other, so that the pressure inside the compression side chamber R2 can be controlled by the degree of opening of the control valve V. Namely, when the piston rod 12 enters the cylinder 10, the liquid extruded from the cylinder 10 moves to the reservoir R through the compression side damping passage 16 and the bypass passage 18. At this time, when the degree of opening of the control valve V is reduced, the liquid is hard to move to the reservoir R, and therefore, the pressure inside the compression side chamber R2 is increased. On the contrary, when the degree of opening of the control valve V is increased, the liquid is easy to move to the reservoir R, and therefore, the pressure inside the compression side chamber R2 is decreased.

As the front wheel side damper FD (rear wheel side damper RD) receives the pressure inside the compression side chamber R2 by the piston 11 and exhibits the compression side damping force that suppresses the contraction operation, it is possible to control the compression side damping force by controlling the pressure of the compression side chamber R2. When the passage area in the control valve V is minimized, the pressure of the compression side chamber R2 of the front wheel side damper FD (rear wheel side damper RD) is maximized, and when the passage area in the control valve V is maximized, the pressure of the compression side chamber R2 of the front wheel side damper FD (rear wheel side damper RD) is minimized. Although the pressure of the compression side chamber R2 of the front wheel side damper FD (rear wheel side damper RD) is also changed by a contraction speed, the pressure of the compression side chamber R2 of the front wheel side damper FD (rear wheel side damper RD) can be maximized when the passage area is minimized at any contraction speed. Incidentally, the control valve V may be set to block the bypass passage 18 by setting the passage area to zero when the passage area is minimized.

When the liquid filled in the cylinder 10 of the front wheel side damper FD (rear wheel side damper RD) is electroviscous fluid or magnetic viscous fluid, a device capable of applying a voltage or a magnetic field to the bypass passage 18 may be incorporated therein, instead of the control valve V. In this case, this device serves as the pressure controlling element, and adjusts the magnitude of an electric field or the magnetic field according to instructions from the control unit 5. Thus, the pressure inside the compression side chamber R2 can be controlled by changing the resistance applied to the fluid flowing through the bypass passage 18.

The pressure sensor 3 is attached to the position that can detect the pressure Pf inside the compression side chamber R2 of the front wheel side damper FD, that is on the upstream side of the compression side damping passage 16 allowing the compression side chamber R2 and the reservoir R to be in communication with each other, and that is upstream of the control valve V of the bypass passage 18. The pressure sensor 3 detects the pressure Pf of the compression side chamber R2 in the front wheel side damper FD, and outputs the detected value to the control unit 5. In addition, the pressure sensor 4 is attached to the position that can detect the pressure Pr inside the compression side chamber R2 of the rear wheel side damper RD, that is on the upstream side of the compression side damping passage 16 allowing the compression side chamber R2 and the reservoir R to be in communication with each other, and that is upstream of the control valve V of the bypass passage 18. The pressure sensor 4 detects the pressure Pr of the compression side chamber R2 in the rear wheel side damper RD, and outputs the detected value to the control unit 5.

When each of the front wheel side damper FD and the rear wheel side damper RD is configured like the above, it is possible to control the pressure of the compression side chamber R2 by adding the bypass passage 18 and the pressure controlling element to the general damper. This facilitates the installation of the pressure sensors 3 and 4. Further, as the cylinder 10 side is installed on the vehicle body B side, the pressure sensors 3 and 4 and the pressure controlling element are arranged on the vehicle body B side, thus improving reliability of the damper control device 1 as compared with the case where the cylinder 10 is arranged on the wheel side to which vibration with high frequency and large amplitude is inputted. Furthermore, it is possible to facilitate extraction of signals and handling of signal lines and harnesses that are used for supplying a current, and to suppress deterioration.

The rate sensor 2 is the sensor capable of detecting the pitching angular velocity, such as a sensor using a gyro. The rate sensor 2 is provided at the center of pitching rotation of the vehicle body B or in the vicinity thereof, or near the center of gravity of the vehicle body B, detects the pitching angular velocity ω of the vehicle body B, and outputs it to the control unit 5. Incidentally, the position of the rate sensor 2 to be installed on the vehicle body B is not limited to the above-described position, but may be installed at another position.

As illustrated in FIG. 1 and FIG. 3, the control unit 5 is provided with a regulator 21 that obtains a target torque τ for suppressing the pitching of the vehicle body B from the pitching angular velocity ω, a switch 22 that selects the damper capable of producing the compression side damping force in the direction suppressing the pitching of the vehicle body B from a sign of the target torque τ obtained by the regulator 21, a multiplication unit 23 that obtains a target pressure Pf* of the compression side chamber R2 of the front wheel side damper FD by multiplying the target torque τ, inputted when the front wheel side damper FD is selected by the switch 22, by a coefficient Kf, a deviation computation unit 24 that obtains a deviation εPf between the pressure Pf* obtained by the multiplication unit 23 and the pressure Pf detected by the pressure sensor 3, a regulator 25 that obtains a target current If* to be applied to the control valve V of the front wheel side damper FD from the deviation εPf obtained by the deviation computation unit 24, a limiter 26 that obtains a final current command If to be applied to the control valve V of the front wheel side damper FD by saturation calculation to limit the lower limit and the upper limit of the target current If*, a multiplication unit 27 that obtains a target pressure Pr* of the compression side chamber R2 of the rear wheel side damper RD by multiplying the target torque τ, inputted when the rear wheel side damper RD is selected by the switch 22, by a coefficient Kr, a deviation computation unit 28 that obtains a deviation εPr between the pressure Pr* obtained by the multiplication unit 27 and the pressure Pr detected by the pressure sensor 4, a regulator 29 that obtains a target current Ir* to be applied to the control valve V of the rear wheel side damper RD from the deviation εPr obtained by the deviation computation unit 28, and a limiter 30 that obtains a final current command Ir to be applied to the control valve V of the rear wheel side damper RD by the saturation calculation to limit the lower limit and the upper limit of the target current Ir*.

The regulator 21 obtains the target torque τ for suppressing the pitching of the vehicle body B from the pitching angular velocity ω. The regulator 21 obtains the target torque τ, with which the pitching angular velocity of the vehicle body B approaches zero, from the pitching angular velocity ω, by multiplying the pitching angular velocity ω by a proportional gain, by using a function using the pitching angular velocity as a parameter, or by performing map computation.

The switch 22 selects, out of the front wheel side damper FD and the rear wheel side damper RD, the damper that is compressed by the pitching of the vehicle body B and is able to produce the compression side damping force in the direction suppressing the pitching, based on the sign of the target torque τ.

Assuming that the rotation direction in which the vehicle body B tilts toward the front wheel side is positive, and when the sign of the target torque τ is positive, it is supposed that the pitching is caused in the direction in which the vehicle body B tilts toward the rear wheel side. It is the rear wheel side damper RD that can produce the compression side damping force in the direction suppressing the pitching of the vehicle body B toward the rear wheel side, and therefore, the switch 22 selects the rear wheel side damper RD, and the target torque τ is inputted to the multiplication unit 27. When the sign of the target torque τ is negative, it is supposed that the pitching is caused in the direction in which the vehicle body B tilts toward the front wheel side. It is the front wheel side damper FD that can produce the compression side damping force in the direction suppressing the pitching of the vehicle body B toward the front wheel side, and therefore, the switch 22 selects the front wheel side damper FD, and the target torque τ is inputted to the multiplication unit 23.

The multiplication unit 23 obtains the target pressure Pf* of the compression side chamber R2 of the front wheel side damper FD by multiplying the target torque τ by the coefficient Kf. The coefficient Kf is for converting the target torque τ into the target pressure Pf* of the compression side chamber R2 of the front wheel side damper FD, and is defined in consideration of a distance from the center of gravity of the vehicle body to the mounting position of the front wheel side damper FD, a cross section of the piston 11, and the like. Incidentally, a computation unit that obtains the target pressure Pf* by performing the map computation using the target torque τ as a parameter may be employed instead of the multiplication unit 23.

The deviation computation unit 24 and the regulator 25 form a pressure feedback loop. The regulator 25 is a compensator such as a PID compensator. The regulator 25 may be a PD compensator, an H∞ compensator, or the like.

The multiplication unit 27 obtains the target pressure Pr* of the compression side chamber R2 of the rear wheel side damper RD by multiplying the target torque τ by the coefficient Kr. The coefficient Kr is for converting the target torque τ into the target pressure Pr* of the compression side chamber R2 of the rear wheel side damper RD, and is defined in consideration of a distance from the center of gravity of the vehicle body to the mounting position of the rear wheel side damper RD, the cross section of the piston 11, and the like. Incidentally, a computation unit that obtains the target pressure Pr* by performing the map computation using the target torque τ as a parameter may be employed instead of the multiplication unit 27.

The deviation computation unit 28 and the regulator 29 form a pressure feedback loop. The regulator 29 is the compensator such as the PID compensator, similarly to the regulator 25. The regulator 29 may be the PD compensator, the H∞ compensator, or the like.

The current command outputted from each of the limiters 26 and 30 is transmitted to the corresponding control valve V of the front wheel side damper FD or the rear wheel side damper RD. According to the current command, the control valve V adjusts the degree of opening and controls the pressure of the compression side chamber R2 of each of the front wheel side damper FD and the rear wheel side damper RD. Thereby, the pitching of the vehicle body B is suppressed by the damper control device 1. Incidentally, zero is inputted to either one of the multiplication units 23 and 27 of the front wheel side damper FD and the rear wheel side damper RD that is not selected by the switch 22. Further, the target pressures Pf* and Pr* may be set to zero or a minimum value, so as to reduce the compression side damping force of the front wheel side damper FD or the rear wheel side damper RD that is not selected. Furthermore, the control valve V may be controlled to output the predetermined compression side damping force. In order to prevent saturation of an integrated value at the time of integral compensation by each of the regulators 25 and 29, computation may not be performed for the control path that is not selected by the switch 22, and the predetermined current command may be always outputted to the control valve V of the damper that is not selected.

As described above, the damper control device 1 obtains the target pressures Pf* and Pr* of the compression side chamber R2 of the front wheel side damper FD and the rear wheel side damper RD, based on the pitching angular velocity ω and the pressures Pf and Pr that are respectively detected by the rate sensor 2 and the pressure sensors 3 and 4. Further, the damper control device 1 outputs the current command to the control valve V so that the pressures Pf and Pr of the compression side chambers R2 of the front wheel side damper FD and the rear wheel side damper RD that are detected by the pressure sensors 3 and 4 become the target pressures Pf* and Pr*. Although not illustrated, hardware resources may include an A/D converter for taking in the signals outputted from the rate sensor 2 and the pressure sensors 3 and 4, a storage device in which programs used for processing necessary for the control are stored, such as ROM (Read Only Memory), a computing device for executing the processing based on the programs, such as a CPU (Central Processing Unit), and a storage device for providing a storage area to the CPU, such as RAM (Random Access Memory). When the CPU executes the above-described programs, respective control processing of the control unit 5 can be realized.

The damper control device 1 is provided with the pitching angular velocity detection unit (rate sensor 2) that detects the pitching angular velocity ω of the vehicle body B, the front wheel side pressure detection unit (pressure sensor 3) that detects the pressure of the compression side chamber R2 in the front wheel side damper FD, and the rear wheel side pressure detection unit (pressure sensor 4) that detects the pressure of the compression side chamber R2 in the rear wheel side damper RD. The damper control device 1 controls the pressures of the compression side chambers R2 of the front wheel side damper FD and the rear wheel side damper RD, based on the pitching angular velocity ω and the pressures Pf and Pr of the compression side chambers R2 in the front wheel side damper FD and the rear wheel side damper RD. This eliminates the need for a stroke sensor, and greatly facilitates the installation to the two-wheeled vehicle.

As the pressure inside the compression side chamber R2 is controlled, without adjusting a damping coefficient in each of the front wheel side damper FD and the rear wheel side damper RD, it is possible to improve riding comfortability of the two-wheeled vehicle, without causing an error between the actual damping force and the damping force that each of the dampers is desired to exhibit, due to a change in oil temperature in the damper, and the like.

Further, the damper control device 1 obtains the target torque τ for suppressing the pitching of the vehicle body B from the pitching angular velocity ω, and, according to the target torque τ, selects the damper out of the front wheel side damper FD and the rear wheel side damper RD to be compressed by the pitching. Furthermore, the damper control device 1 obtains the target pressure Pf* or Pr* of the compression side chamber R2 of the selected damper, feeds back the pressure Pf or Pr of the compression side chamber R2 of the selected damper, and controls the pressure of the compression side chamber R2 of the selected damper. Thus, the damper control device 1 can suppress the pitching of the vehicle body B only by selecting the damper capable of producing the compression side damping force for suppressing the pitching of the vehicle body B, and controlling the pressure of the compression side chamber R2. This makes it possible to eliminate the control of the extension side damping force in each of the front wheel side damper FD and the rear wheel side damper RD, and to allow each of the front wheel side damper FD and the rear wheel side damper RD to function as the passive damper at the time of the extension operation.

According to the conventional control device, such a problem may be caused that stability of a vehicle body posture of the two-wheeled vehicle is deteriorated when the extension side damping force in each of the front wheel side damper and the rear wheel side damper becomes too small, such as when a malfunction is caused in its operation. According to the damper control device 1 of this embodiment, however, each of the front wheel side damper FD and the rear wheel side damper RD functions as the passive damper at the time of the extension operation, and the extension side damping force in each of the front wheel side damper FD and the rear wheel side damper RD does not become too small. Therefore, it is possible to suppress the deterioration of the stability of the vehicle body posture of the two-wheeled vehicle.

Next, an explanation will be given to a second embodiment.

Figure 4:
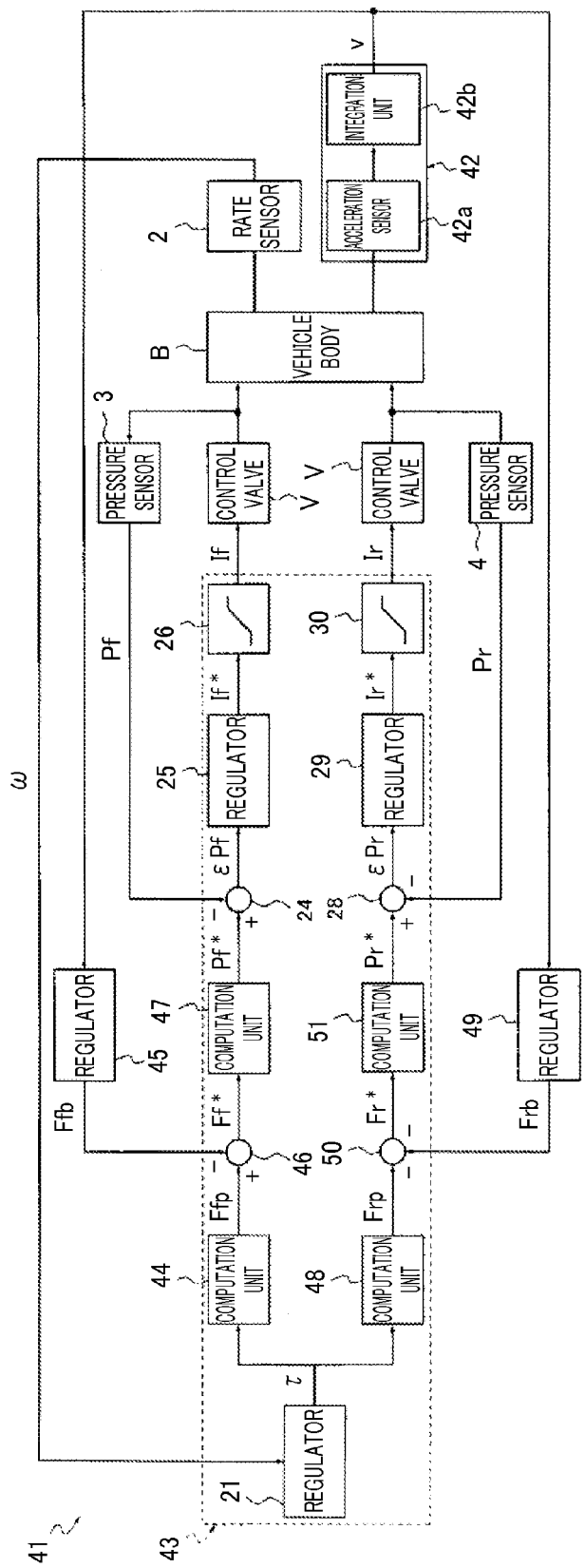
FIG. 4 is a control block diagram of a damper control device according to a second embodiment of the present invention.

As illustrated in FIG. 4, a damper control device 41 according to this embodiment is different from the damper control device 1 according to the first embodiment in that a speed detection unit 42 for detecting a vertical speed v of the vehicle body B is provided, and in that a control unit 43 controls the pressure of the compression side chamber R2 of each of the front wheel side damper FD and the rear wheel side damper RD by taking the vertical speed into account. Hereinafter, an explanation will be given to the features of the damper control device 41 of this embodiment that are different from the damper control device 1 of the first embodiment. The same reference numerals are given to designate the similar parts and the like, and explanations thereof will be omitted.

The speed detection unit 42 is provided with an acceleration sensor 42a that detects a vertical acceleration of the vehicle body B, and an integration unit 42b that obtains the vertical speed v of the vehicle body B by integrating the vertical acceleration of the vehicle body B detected by the acceleration sensor 42a. Incidentally, the integration unit 42b may be combined with the control unit 43. The vertical speed v is inputted to the control unit 43.

The control unit 43 does not have the switch 22 and the multiplication units 23 and 27 of the control unit 5 of the damper control device 1 according to the first embodiment. Instead, the control unit 43 has computation units 44 and 48, regulators 45 and 49, addition units 46 and 50, and computation units 47 and 51 in a path for obtaining the current command of the control valve V of the compression side chamber R2 of the front wheel side damper FD, and in a path for obtaining the current command of the control valve V of the compression side chamber R2 of the rear wheel side damper RD, respectively.

The computation units 44 and 48 perform computation of pitching suppressing damping forces Ffp and Frp to be outputted so that the respective dampers FD and RD suppress the pitching, from the target torque $\tau$. The regulators 45 and 49 perform computation of bounce suppressing damping forces Ffb and Frb to be outputted so that the respective dampers FD and RD suppress bouncing of the vehicle body B, from the vertical speed v of the vehicle body B. The addition units 46 and 50 add the pitching suppressing damping forces Ffp and Frp and the bounce suppressing damping forces Ffb and Frb and perform computation of target compression side damping forces Ff* and Fr* to be outputted by the respective dampers FD and RD. The computation units 47 and 51 obtain target pressures Pf* and Pr* from the target compression side damping forces Ff* and Fr*, respectively.

The computation unit 44 obtains the pitching suppressing damping force Ffp of the front wheel side damper FD by multiplying the target torque $\tau$ by a coefficient Klf. The coefficient Klf is for converting the target torque $\tau$ into the pitching suppressing damping force Ffp of the front wheel side damper FD, and is defined in consideration of the distance from the center of gravity of the vehicle body to the mounting position of the front wheel side damper FD. Incidentally, the computation unit 44 may obtain the pitching suppressing damping force Ffp by performing the map computation using the target torque $\tau$ as a parameter. In either case, the computation unit 44 obtains the damping force that is required for the front wheel side damper FD to suppress the pitching of the vehicle body B, as the pitching suppressing damping force Ffp.

The computation unit 48 obtains the pitching suppressing damping force Frp of the rear wheel side damper RD by multiplying the target torque $\tau$ by a coefficient Klr. The coefficient Klr is for converting the target torque $\tau$ into the pitching suppressing damping force Frp of the rear wheel side damper RD, and is defined in consideration of the distance from the center of gravity of the vehicle body to the mounting position of the rear wheel side damper RD. Incidentally, the computation unit 48 may obtain the pitching suppressing damping force Frp by performing the map computation using the target torque $\tau$ as a parameter. In either case, the computation unit 48 obtains the damping force that is required for the rear wheel side damper RD to suppress the pitching of the vehicle body B, as the pitching suppressing damping force Frp.

The regulator 45 obtains the bounce suppressing damping force Ffb to be produced by the front wheel side damper FD, from the vertical speed v of the vehicle body B. The regulator 45 may obtain the bounce suppressing damping force Ffb by simply multiplying the vertical speed v by the coefficient as a control gain, or may obtain the bounce suppressing damping force Ffb by using a map or a function using the vertical speed v as a parameter. In either case, the regulator 45 obtains the damping force that is required for the front wheel side damper FD to suppress the bouncing of the vehicle body B, as the bounce suppressing damping force Ffb.

The regulator 49 obtains the bounce suppressing damping force Frb to be produced by the rear wheel side damper RD, from the vertical speed v of the vehicle body B. The regulator 49 may obtain the bounce suppressing damping force Frb by simply multiplying the vertical speed v by the coefficient as the control gain, or may obtain the bounce suppressing damping force Frb by using the map or the function using the vertical speed v as the parameter. In either case, the regulator 49 obtains the damping force that is required for the rear wheel side damper RD to suppress the bouncing of the vehicle body B, as the bounce suppressing damping force Frb.

The addition unit 46 performs computation of the target compression side damping force Ff* to be outputted by the front wheel side damper FD, by adding the pitching suppressing damping force Ffp and the bounce suppressing damping force Ffb. When the pitching suppressing damping force Ffp and the bounce suppressing damping force Ffb are added, and when the direction of the compression side damping force of the front wheel side damper FD and the direction of the damping force supported by the target compression side damping force Ff* agree with each other, the addition unit 46 outputs the target compression side damping force Ff* as it is, and when the directions do not agree with each other, the addition unit 46 outputs zero. Similarly, the addition unit 50 performs computation of the target compression side damping force Fr* to be outputted by the rear wheel side damper RD, by adding the pitching suppressing damping force Frp and the bounce suppressing damping force Frb. When the pitching suppressing damping force Frp and the bounce suppressing damping force Frb are added, and when the direction of the compression side damping force of the rear wheel side damper RD and the direction of the damping force supported by the target compression side damping force Fr* agree with each other, the addition unit 50 outputs the target compression side damping force Fr* as it is, and when the directions do not agree with each other, the addition unit 50 outputs zero.

The computation unit 47 obtains the target pressure Pf* of the compression side chamber R2 of the front wheel side damper FD by multiplying the target compression side damping force Ff* by a coefficient Kaf. The coefficient Kaf is for converting the target compression side damping force Fr into the target pressure Pf* of the compression side chamber R2 of the front wheel side damper FD, and is defined in consideration of the cross section of the piston 11. The computation unit 51 obtains the target pressure Pr* of the compression side chamber R2 of the rear wheel side damper RD by multiplying the target compression side damping force Fr* by a coefficient Kar. The coefficient Kar is for converting the target compression side damping force Fr* into the target pressure Pr* of the compression side chamber R2 of the rear wheel side damper RD, and is defined in consideration of the cross section of the piston 11.

When the target pressures Pf* and Pr* are obtained, the current commands If and Ir are obtained by the pressure feedback loops in the respective paths, similarly to the damper control device 1. Thus, the currents according to the current commands are supplied to the control valves V of the front wheel side damper FD and the rear wheel side damper RD, so that the pressures of the compression side chambers R2 of the front wheel side damper FD and the rear wheel side damper RD are controlled.

It is possible for the damper control device 41 to suppress vibrations of the vehicle body B by considering not only the pitching but also the bouncing of the vehicle body B. Namely, in the process of obtaining the target pressures Pf* and Pr*, the damper control device 41 corrects the pitching suppressing damping forces Ffp and Frp for suppressing the pitching by the bounce suppressing damping forces, so as to suppress sinking or floating of the vehicle body B effectively. Thus, it is possible to improve the riding comfortability of the two-wheeled vehicle more certainly.

Further, when the bounce suppressing damping forces Ffb and Frb are obtained by multiplying the vertical speed v by the coefficients in the regulators 45 and 49, the control approximate to the skyhook control can be performed by the damper control device 41. Thus, the vibrations of the vehicle body B can be suppressed effectively.

Next, an explanation will be given to a third embodiment.

Figure 5:
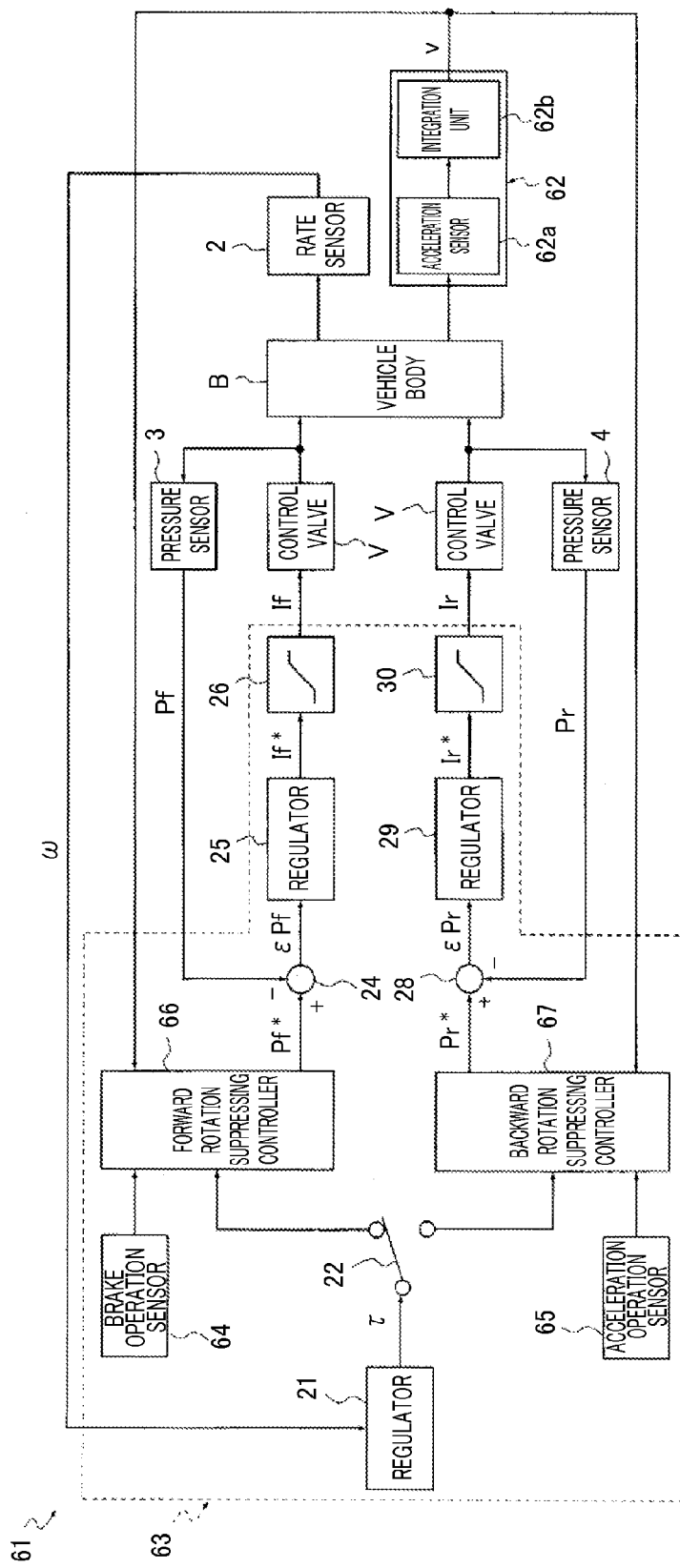
FIG. 5 is a control block diagram of a damper control device according to a third embodiment of the present invention.

As illustrated in FIG. 5, a damper control device 61 according to this embodiment is provided with a speed detection unit 62 that detects the vertical speed v of the vehicle body B, a brake operation sensor 64 that detects brake operation by a driver of the two-wheeled vehicle and inputs a brake signal to a control unit 63, and an acceleration operation sensor 65 that detects acceleration operation by the driver of the two-wheeled vehicle and inputs an acceleration signal to the control unit 63. Thus, in addition to the vertical speed taken into account by the control unit 63, it is possible to separately design a control system of the pitching of the vehicle body B that sinks on the front wheel side, and a control system of the pitching of the sink vehicle body B that sinks on the rear wheel side.

Hereinafter, an explanation will be given to the features of the damper control device 61 of this embodiment that are different from the damper control device 1 of the first embodiment. The same reference numerals are given to designate the similar parts and the like, and explanations thereof will be omitted.

The speed detection unit 62 is provided with an acceleration sensor 62a that detects a vertical acceleration of the vehicle body B, and an integration unit 62b that obtains the vertical speed v of the vehicle body B by integrating the vertical acceleration of the vehicle body B detected by the acceleration sensor 62a. Incidentally, the integration unit 62b may be combined with the control unit 63. The vertical speed v is inputted to the control unit 63.

When the driver brakes, the brake operation sensor 64 outputs the brake signal, by which the control unit 63 can identify that on operation of the brake is made, to the control unit 63. When the driver accelerates, the acceleration operation sensor 65 outputs the acceleration signal, by which the control unit 63 can identify that on operation of the accelerator is made, to the control unit 63.

The control unit 63 does not have the multiplication units 23 and 27 of the control unit 5 of the damper control device 1 according to the first embodiment. The control unit 63 has a forward rotation suppressing controller 66, instead of the multiplication unit 23, in a path for obtaining the current command of the control valve V of the compression side chamber R2 of the front wheel side damper FD, and has a backward rotation suppressing controller 67, instead of the multiplication unit 27, in a path for obtaining the current command of the control valve V of the compression side chamber R2 of the rear wheel side damper RD.

When the front wheel side damper FD is selected by the switch 22, the forward rotation suppressing controller 66 obtains the target pressure Pf* of the compression side chamber R2 of the front wheel side damper FD, based on the target torque τ, the vertical speed v, and the presence/absence of the brake signal. The forward rotation suppressing controller 66 obtains from the target torque τ the damping force required for suppressing the pitching, obtains from the vertical speed v the damping force required for suppressing the bouncing, and adds the damping forces, so as to obtain the compression side damping force of the front wheel side damper FD.

When there is the brake signal, the forward rotation suppressing controller 66 outputs the target pressure Pf* by multiplying the compression side damping force by a coefficient that is one or more, adding a value that is in proportion to a brake force, or the like. When there is no brake signal, the forward rotation suppressing controller 66 outputs the compression side damping force as it is as the target pressure Pf*. Incidentally, the computation method of the target pressure Pf* by the forward rotation suppressing controller 66 is not limited to the above-described method, and can be changed, as appropriate, to be best suited for the two-wheeled vehicle to which the damper control device 61 is applied.

When the rear wheel side damper RD is selected by the switch 22, the backward rotation suppressing controller 67 obtains the target pressure Pr* of the compression side chamber R2 of the rear wheel side damper FD, based on the target torque τ, the vertical speed v, and the presence/absence of the acceleration signal. The backward rotation suppressing controller 67 obtains from the target torque τ the damping force required for suppressing the pitching, obtains from the vertical speed v the damping force required for suppressing the bouncing, and adds the damping forces, so as to obtain the compression side damping force of the rear wheel side damper RD.

When there is the acceleration signal, the backward rotation suppressing controller 67 outputs the target pressure Pr* by multiplying the compression side damping force by a coefficient that is one or more, and when there is no acceleration signal, the backward rotation suppressing controller 67 outputs the compression side damping force as it is as the target pressure Pr*. Incidentally, the computation method of the target pressure Pr* by the backward rotation suppressing controller 67 is not limited to the above-described method, and can be changed, as appropriate, to be best suited for the two-wheeled vehicle to which the damper control device 61 is applied.

When the target pressures Pf* and Pr* are obtained, the current commands If and Ir are obtained by the pressure feedback loops in the respective paths, similarly to the damper control device 1. Thus, the currents according to the current commands are supplied to the control valves V of the front wheel side damper FD and the rear wheel side damper RD, so as to control the pressures of the compression side chambers R2 of the front wheel side damper FD and the rear wheel side damper RD.

It is possible for the damper control device 61 to separately and independently design the control suitable for forward pitching of the vehicle body B and the control suitable for backward pitching. Thus, posture control corresponding to behaviors or operating conditions of the two-wheeled vehicle can be made possible, so that the riding comfortability can be improved more certainly.

According to the damper control device 61, the forward pitching control and the backward pitching control are made by independent linear controllers, and the design can be made with ease. The damper control device 61 takes in a characteristic input at the time of the forward pitching, that is, the brake signal in this case, so as to suppress the forward pitching efficiently by using the control specialized for the forward pitching. Further, the damper control device 61 takes in a characteristic input at the time of the backward pitching, that is, the acceleration signal in this case, so as to suppress the backward pitching efficiently by using the control specialized for the backward pitching.

It should be noted that, according to the above-described embodiments, the pressure sensors 3 and 4 are used as the front wheel side pressure detection unit and the rear wheel side pressure detection unit, and the pressure sensors 3 and 4 detect the pressures of the compression side chambers R2 of the front wheel side damper FD and the rear wheel side damper RD. Instead of these, however, the damping forces of the front wheel side damper FD and the rear wheel side damper RD may be detected, and divided by the cross section of the piston 11, so as to obtain the pressures of the compression side chambers R2. The damping forces of the front wheel side damper FD and the rear wheel side damper RD may be detected by measuring stresses of attachment members of the front wheel side damper FD and the rear wheel side damper RD onto the vehicle body B of the two-wheeled vehicle, or the piston rod 12, by a strain gauge, or may be detected by a force sensor.

In this case, each of the front wheel side pressure detection unit and the rear wheel side pressure detection unit may be formed by the strain gauge or the force sensor, instead of the pressure sensor 3 or 4, and a processing device that perform computation processing for obtaining the pressure of the compression side chamber R2 from the damping force detected by the strain gauge or the force sensor. Thus-structured processing device may be combined to the control unit 5 or 43.

Further, the damping forces that are produced by the front wheel side damper FD and the rear wheel side damper RD and the pressures of the compression side chambers R2 in the front wheel side damper FD and the rear wheel side damper RD are generally in proportion to each other. Therefore, according to the setting of the gain, the damping forces can be processed as it is as the pressures of the compression side chambers R2 of the front wheel side damper FD and the rear wheel side damper RD. The damping forces may be fed back to obtain the target pressures Pf* and Pr* of the compression side chambers R2. Thus, the front wheel side pressure detection unit and the rear wheel side pressure detection unit may be configured to detect the damping forces of the front wheel side damper FD and the rear wheel side damper RD.

The embodiments of the present invention described above are merely illustration of some application examples of the present invention and not of the nature to limit the technical scope of the present invention to the specific constructions of the above embodiments.

The present application claims a priority based on Japanese Patent Application No. 2012-214410 filed with the Japan Patent Office on Sep. 27, 2012 and Japanese Patent Application No. 2013-190097 filed with the Japan Patent Office on Sep. 13, 2013, all the contents of which are hereby incorporated by reference.

The invention claimed is:

1. A damper control device for controlling a pressure of a compression side chamber of a front wheel side damper that is interposed between a vehicle body and a front wheel of a two-wheeled vehicle, and a pressure of a compression side chamber of a rear wheel side damper that is interposed between the vehicle body and a rear wheel, the damper control device comprising:
   a pitching angular velocity detection sensor adapted to detect a pitching angular velocity of the vehicle body;
   a front wheel side pressure detection sensor adapted to detect the pressure of the compression side chamber in the front wheel side damper;
   a rear wheel side pressure detection sensor adapted to detect the pressure of the compression side chamber in the rear wheel side damper; and
   a controller controlling
      the pressure of the compression side chamber in the front wheel side damper based on the pitching angular velocity, and
      the pressure of the compression side chamber in the rear wheel side damper based on the pitching angular velocity.

2. The damper control device according to claim 1, wherein:
- the controller obtains a target torque for suppressing pitching of the vehicle body from the pitching angular velocity;
- the controller selects a selected damper out of the front wheel side damper and the rear wheel side damper compressed by the pitching based on the target torque;
- the controller obtains a target pressure of the compression side chamber of the selected damper; and
- the controller performs feedback control to control the pressure of the compression side chamber of the selected damper.

3. The damper control device according to claim 1, further comprising a speed detection sensor adapted to detect a vertical speed of the vehicle body, wherein:
- the controller obtains a target torque for suppressing pitching of the vehicle body from the pitching angular velocity;
- the controller obtains from the target torque, pitching suppressing damping forces, required for eliminating the pitching, of the front wheel side damper and the rear wheel side damper;
- the controller obtains from the vertical speed, bounce suppressing damping forces, required for eliminating bouncing of the vehicle body, of the front wheel side damper and the rear wheel side damper;
- the controller obtains a target front wheel side pressure of the compression side chamber in the front wheel side damper from one of the pitching suppressing damping forces on a side of the front wheel and one of the bounce suppressing damping forces on the side of the front wheel, and controller performs feedback control to control said pressure of the compression side chamber in the front wheel side damper; and
- the controller obtains a target rear wheel side pressure of the compression side chamber in the rear wheel side damper from another pitching suppressing damping force of the pitching suppressing damping forces on a side of the rear wheel and another bounce suppressing damping force of the bounce suppressing damping forces on the side of the rear wheel, and the controller performs feedback control to control said pressure of the compression side chamber in the rear wheel side damper.

4. The damper control device according to claim 1, further comprising a speed detection sensor adapted to detect a vertical speed of the vehicle body, wherein:
- the controller obtains a target torque for suppressing pitching of the vehicle body from the pitching angular velocity;
- the controller selects a selected damper out of the front wheel side damper and the rear wheel side damper compressed by the pitching based on the target torque;
- the controller obtains a target pressure of the compression side chamber in the selected damper based on the target torque and the vertical speed; and
- the controller performs feedback control to control the pressure of the compression side chamber of the selected damper.

5. The damper control device according to claim 4, wherein
- when the front wheel side damper is selected as the selected damper, the controller obtains the target pressure of the compression side chamber in the front wheel side damper based on the target torque, the vertical speed, and a brake signal of the two-wheeled vehicle.

6. The damper control device according to claim 4, wherein
- when the rear wheel side damper is selected as the selected damper, the controller obtains the target pressure of the compression side chamber in the rear wheel side damper based on the target torque, the vertical speed, and an acceleration signal of the two-wheeled vehicle.

7. The damper control device according to claim 1, wherein:
- each of the front wheel side damper and the rear wheel side damper comprises
  - a cylinder,
  - a piston that is slidably inserted into the cylinder and that divides the cylinder into the compression side chamber and an extension side chamber, in which liquid is filled,
  - a reservoir that is in communication with the compression side chamber,
  - an extension side damping passage that applies resistance to a liquid flow flowing from the extension side chamber to the compression side chamber,
  - a compression side passage that is provided in parallel to the extension side damping passage and that permits only a liquid flow flowing from the compression side chamber to the extension side chamber,
  - a compression side damping passage that applies resistance to a liquid flow flowing from the compression side chamber to the reservoir,
  - an intake passage that is provided in parallel to the compression side damping passage and that permits only a liquid flow flowing from the reservoir to the compression side chamber, and
  - a bypass passage that is provided in parallel to the compression side damping passage and the intake passage and that allows the compression side chamber and the reservoir to be in communication with each other; and
- a pressure controlling valve controlled by the controller for adjusting the pressure of the compression side chamber, the pressure controlling valve is provided at a middle part of the bypass passage.

* * * * *